US011964581B2

(12) United States Patent
Frelich et al.

(10) Patent No.: US 11,964,581 B2
(45) Date of Patent: Apr. 23, 2024

(54) SYSTEM, APPARATUS, AND METHOD FOR USING INTEGRATED GENERATOR IN A MOBILE MACHINE AS JOBSITE CHARGING STATION

(71) Applicant: Caterpillar Paving Products Inc., Brooklyn Park, MN (US)

(72) Inventors: Toby A. Frelich, Saint Michael, MN (US); Brian D. Nagel, Ramsey, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 161 days.

(21) Appl. No.: 17/496,802

(22) Filed: Oct. 8, 2021

(65) Prior Publication Data

US 2023/0112291 A1 Apr. 13, 2023

(51) Int. Cl.
*B60L 53/57* (2019.01)
*B60L 53/14* (2019.01)
*B60L 53/63* (2019.01)
*E01C 19/48* (2006.01)

(52) U.S. Cl.
CPC ............. *B60L 53/57* (2019.02); *B60L 53/14* (2019.02); *B60L 53/63* (2019.02); *B60L 2200/40* (2013.01); *E01C 19/4873* (2013.01); *E01C 2301/00* (2013.01); *E01C 2301/10* (2013.01)

(58) Field of Classification Search
CPC .......... B60L 53/57; B60L 53/14; B60L 53/63; B60L 2200/40
See application file for complete search history.

(56) References Cited

U.S. PATENT DOCUMENTS

| 5,659,237 | A  | * | 8/1997  | Divan .................... B60L 58/15 320/DIG. 13 |
| 8,636,442 | B1 |   | 1/2014  | Sopko, Jr. et al. |
| 9,382,675 | B2 |   | 7/2016  | Frelich et al. |
| 9,623,762 | B2 | * | 4/2017  | Park ........................ B60L 53/63 |
| 11,014,464 | B2 |  | 5/2021  | Ambrosetti |
| 11,091,053 | B2 | * | 8/2021  | Ma .......................... B60L 53/11 |
| 2006/0244411 | A1 | * | 11/2006 | Wobben .................. B60L 53/20 320/104 |
| 2012/0299544 | A1 | * | 11/2012 | Prosser .................. H02J 7/342 320/109 |

(Continued)

FOREIGN PATENT DOCUMENTS

DE    102013104211 A1    10/2014
DE    102017219760 A1 *  5/2019 ............. B60L 50/60

(Continued)

*Primary Examiner* — Frank B Vanaman
(74) *Attorney, Agent, or Firm* — XSENSUS, L.L.P.

(57) ABSTRACT

A system, apparatus, and method may operatively couple to an integrated generator that supplies power to a component of a mobile machine that intermittently demands power during operation of the mobile machine and to a charging station. On condition that the component in the mobile machine does not need power, power may be supplied to the charging station. On condition that an electric mobile machine is connected to the charging station, power from the charging station may be supplied to the electric mobile machine. Otherwise, power may be supplied to the charging station in an energy accumulator to store the power.

13 Claims, 5 Drawing Sheets

(56) References Cited

U.S. PATENT DOCUMENTS

| | | | |
|---|---|---|---|
| 2013/0054070 A1* | 2/2013 | Nakagawa | B60L 15/2009 |
| | | | 701/22 |
| 2020/0238848 A1* | 7/2020 | Vliet | B60L 53/305 |
| 2020/0361329 A1 | 11/2020 | Schütz et al. | |
| 2021/0008997 A1 | 1/2021 | Marsolek | |
| 2023/0014378 A1* | 1/2023 | Ciesco | B60L 53/57 |

FOREIGN PATENT DOCUMENTS

| | | | | |
|---|---|---|---|---|
| GB | 2598899 A | * | 3/2022 | B60L 15/32 |
| WO | 2020/200509 A1 | | 10/2020 | |

* cited by examiner

SYSTEM, APPARATUS, AND METHOD FOR USING INTEGRATED GENERATOR IN A MOBILE MACHINE AS JOBSITE CHARGING STATION

TECHNICAL FIELD

Embodiments of the disclosed subject matter relate to systems, apparatuses, and methods for using an integrated generator in a machine as a jobsite charging station.

BACKGROUND

During a paving process, screed must be heated so that the hot paving material does not stick to the bottom surface as the screed passes over and compacts the mat. The screed has a plurality of electrical heating elements that heat the screed to the necessary temperature for paving. The heating elements receive electricity via relays from a generator in the paving machine.

U.S. Pat. No. 8,636,442 ("the '442 patent"), issued on Jan. 28, 2014, and entitled, "Integrated Generator for Screed Plate Heat Up," discloses a paving machine with a power source such as an internal combustion engine that drives a pump drive with an integrated generator. The integrated generator outputs AC power to a power converter that in turn outputs DC power to a power distribution box in the screed for distribution of the power to the screed heating elements. The integrated generator provides power to the screed heating elements, but the paving machine still utilizes the pump drive and other hydraulic pumps and motors to provide power to the other mechanical elements.

U.S. Pat. No. 9,382,675 ("the '675 patent"), issued on Jul. 5, 2016, and entitled, "Electric powered systems for paving machines," discloses that mechanical components and heating of the screed may be powered by different electrical power distribution arrangements using power from an internal generator. An electronic control module may be programmed with a peak shaving strategy for efficiently distributing the available electrical power to meet short term power requirements within the paving machine.

German Patent Application Publication DE102013104211 A1, published Oct. 30, 2014, and entitled "Road paver or feeder, compressor, and method for operating a construction machine System" discloses switching entire energy storage devices between machines. This involves exchanging energy storage devices using a loading station and requires the energy storage devices in the machines are interchangeable.

SUMMARY

According to an aspect of the present disclosure a paving machine is disclosed or implemented. The paving machine may include an integrated generator that supplies power to a component of the paving machine that intermittently demands power during operation of the paving machine, a charging station to provide power from the integrated generator to charge an electric mobile machine, and circuitry to operatively couple the charging station and the integrated generator. The charging station may include an energy accumulator and a connector for the electric, mobile machine. The circuitry may be configured to, on condition that power is supplied by the integrated generator and an electric mobile machine is connected, charge the electric mobile machine, on condition that power is supplied by the integrated generator and no electric mobile machine is connected, store power in the energy accumulator, and on condition that an electric mobile machine is connected and power is not supplied by the integrated generator, charge the electric mobile machine from the energy accumulator.

According to another aspect of the present disclosure a system is disclosed or implemented. The system may include circuitry operatively coupled to an integrated generator that supplies power to a component of a mobile machine that intermittently demands power during operation of the mobile machine and to a charging station. The circuitry configured to, on condition that the component in the mobile machine does not need power, supply power to the charging station; and on condition that an electric mobile machine is connected to the charging station, supply power from the charging station to the electric mobile machine, otherwise store power supplied to the charging station in an energy accumulator.

And in another aspect of the present disclosure is a method for operating a mobile machine on a jobsite to provide power to a charging station for charging an electric mobile machine. The mobile machine including an integrated generator that is used intermittently by a component of the mobile machine during operation of the mobile machine. The method may include operating the integrated generator in the mobile machine to produce power, the power to be supplied to the component in the mobile machine and to the charging station. On condition that the component in the mobile machine does not need power, supplying power to the charging station. The method may further include at least one of storing power supplied to the charging station and using power supplied to the charging station to charge an electric mobile machine connected to the charging station.

DETAILED DESCRIPTION

Embodiments of the disclosed subject matter relate to systems, apparatuses, and methods for using power generated by an integrated generator of a machine, e.g., a paving machine, to charge one or more other machines at a jobsite.

Currently, many jobsites are full of electric machines that need to be charged. Thus, there is a need for a mobile charging station or any other equipment to keep the electric machines charged. This is particularly a problem in areas that are far away from any electrical infrastructure. One or more embodiments are directed to utilizing powered output by an internal generator on a mobile machine that is only used intermittently, e.g., a generator used to heat plates on an asphalt screed, to power one or more other electric machines (e.g., fully or partially electric). Examples of machines that include generators that may be used only intermittently so that power therefrom may be used for charging other machines include a paving machine and a dozer. For example, once heat plates are sufficiently heated in a paving machine, the power from the generator may not need to be supplied continuously to the heat plates. Therefore, rather that stopping power generation, the power (e.g., excess) may be diverted to powering an electric mobile machine or to be stored for later user. As described in detail below, the state of the element that intermittently uses the power from the generator may be monitored such that when that element again requires power, the power may be directed thereto.

First, a general layout of a paving machine 10 will be described with reference to FIGS. 1 and 2. Then, with reference to FIGS. 3 and 4, details of a power sharing arrangement according to one or more embodiments of the present disclosure will be described. Finally, FIG. 5 provides a basic flow chart of a control method according to one or more embodiments of the present disclosure.

Figure 1:
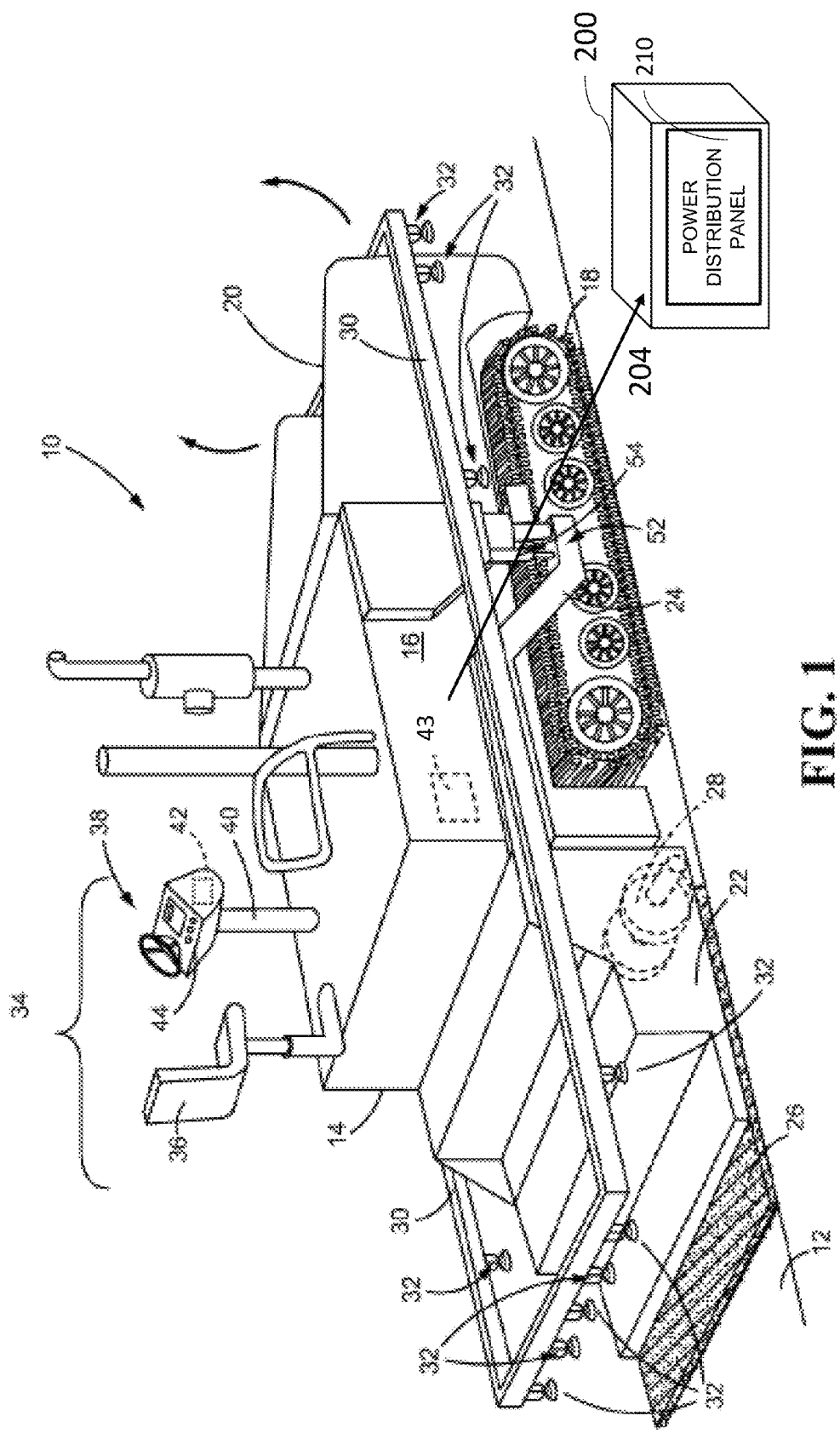
FIG. 1 is a perspective view of a paving machine according to one or more embodiments of the present disclosure with an external charging station.
Figure 2:
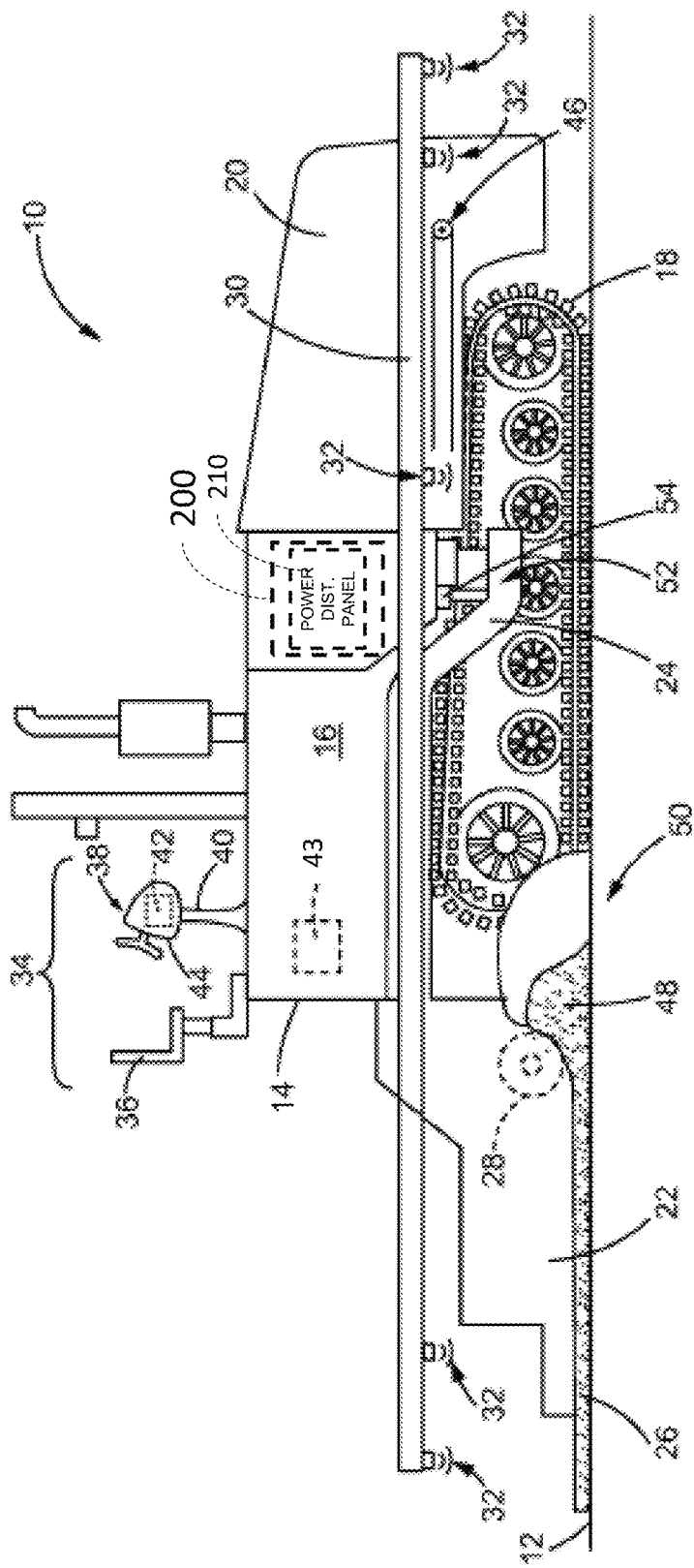
FIG. 2 is a side view of the paving machine according to one or more embodiments of the present disclosure with an internal charging station.
Figure 3:
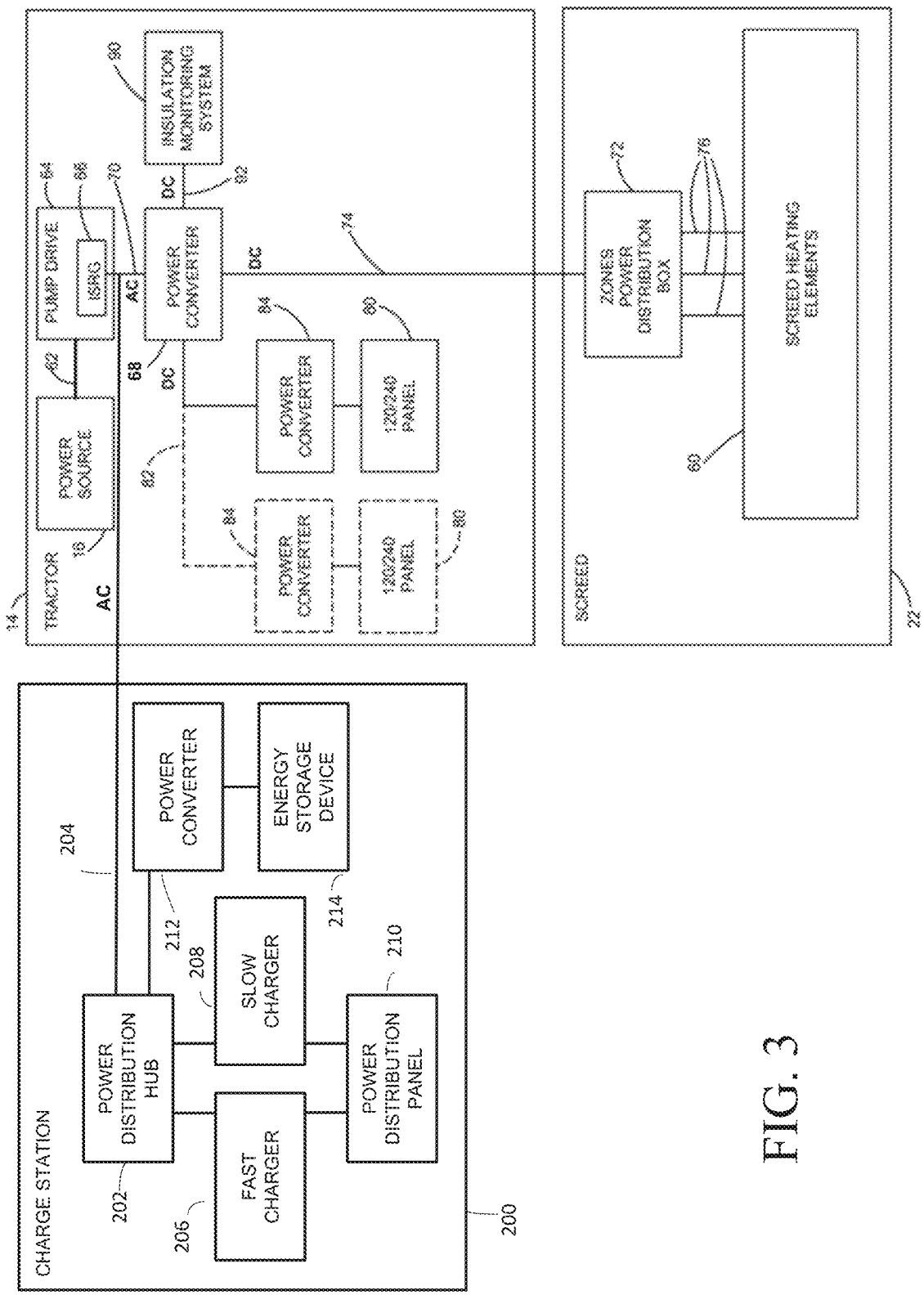
FIG. 3 is a block diagram of electrical power distribution components according to one or more embodiments of the disclosed subject matter in the paving machine.

FIG. 1 is an illustration of the paving machine 10 and a charging station 200 in communication with the paving machine 10, to be discussed in detail below. The charging station 200 is illustrated FIG. 1 as being separate from the paving machine 10 and in FIG. 2 as being integral with, e.g., inside or affixed to, the paving machine 10. In any event, the charging station 200 can be mobile with the paving machine 10. As shown in FIG. 3, for instance, the charging station 200 can include an AC electrical connection 204 to connect to a power source 16 of the paving machine 10 and a power distribution panel 210 to which other electric machines may be connected to be charged.

Although the paving machine 10 is depicted in the figures as an asphalt paver, the presently disclosed control system may be used on any kind machine that includes an internal generator that does not need to be continuously run to provide operation of the machine, i.e., a machine that has components powered by the internal generator that only require power intermittently, e.g., power used to heat heating elements. The paving machine 10 can include a tractor 14 having the power source 16, such as a gas turbine engine, a gas or diesel internal combustion engine, a motor or the like, one or more traction devices 18, and a hopper 20 for containing paving material. Thus, the power source 16 may use fuel that is more readily transportable and refillable than energy accumulators. The traction devices 18 may be operatively coupled to the power source 16 by a transmission mechanism to drive the traction devices 18 and propel the paving machine 10.

The paving machine 10 also includes a screed 22 attached to tractor 14 by tow arms 24 and towed behind tractor 14 to spread and compact the paving material into a mat 26 on a paving surface 12. The screed 22 may include one or more augers 28 for spreading the paving material to the lateral extents of the screed 22. In addition, the paving machine 10 may include a sensor frame 30 attached to the screed 22 and/or to the tow arms 24. The sensor frame 30 may include one or more sensors 32 that may sense values of various parameters relating to the operation of the paving machine 10, such as the height of the paving machine 10 at various locations, height of the mat 26 relative to the paving surface 12, and temperatures of the paving material (e.g., in the hopper 20 and/or the auger 28), the screed 22, and/or the mat 26.

The paving machine 10 can also include an operator station 34 for one or more operators. The operator station 34 can include a seat 36 and an operation console 38 that may be mounted on a pedestal 40, for instance. The operator station 34 can include a tractor controller or electronic control module (ECM) 42, as well as a human-machine interface 44 for accepting user input and displaying information to the operator in the case of a non-fully autonomous paving machine 10. The human-machine interface 44 may have a combination of buttons, switches, dials, levers, touch screens and other control devices that may allow the operator to input commands to the tractor ECM 42 for controlling the operation of the various components of the paving machine 10. Additionally or alternatively, a human-machine interface 43 may be provided on a side of the paving machine 10.

The hopper 20 of the paving machine 10 can contain the paving material that is to be formed into the mat 26 on the paving surface 12. The paving material may be dumped into the hopper 20 at the front of the paving machine 10 from trucks that deliver the paving material to a work site. Referring to FIG. 2, the paving machine 10 may include one or more conveyors 46 to convey paving material provided in the hopper 20 to the auger 28. As the paving machine 10 travels forward, a pile 48 (shown in a cut away portion 50 of FIG. 2) of paving material dropped behind the tractor 14 and in front of the screed 22 onto the paving surface 12 may be evenly spread and compacted by the heated screed 22. Some of the paving material at the outward sides of the hopper 20 may not feed down to the conveyors 46 and instead may accumulate at the sides of the hopper 20. Funneling of the accumulated paving material to the conveyors 46 may be promoted by having the left and right sides of the hopper 20 articulate so that the sides may be raised by actuators together or independently to cause the material to flow down to the conveyors 46 (motion indicated by arrows in FIG. 1).

The screed 22 can spread the pile 48 evenly and can compact the paving material into the mat 26 on the paving surface 12. The screed 22 can be attached to the tractor 14 at tow points 52 by the tow arms 24. The height of the screed 22 can be adjusted by raising and/or lowering the tow arms 24 at the tow points 52, for instance, with screed height actuators 54.

FIG. 3 illustrates a block diagram in accordance with the present disclosure of electrical power distribution components of the paving machine 10 for generating electrical power and providing the electrical power to heating elements 60 to heat the screed 22, as well as to other components of the tractor 14, and notably selectively also to the charging station 200 in communication the paving machine 10. Mechanical power output by the power source 16 (e.g., as noted above, a gas turbine engine, a gas or diesel internal combustion engine, a motor or the like,) can be converted to electrical power that is usable by the screed heating elements 60 to heat the screed heating elements 60 and hence the screed 22. A rotating output shaft 62 of the power source 16 can be connected to a pump drive 64 within the tractor 14. The pump drive 64 can house internal gear drives that in turn have pumps and motors coupled thereto and can include an integrated generator (ISRG) 66. As the output shaft 62 of the power source 16 drives the gear drives of the pump drive 64, the pumps and motors can generate hydraulic, pneumatic, and mechanical power for various systems of the paving machine 10.

An output AC power of the integrated generator 66 can be connected to an input of a first power converter 68 via an AC electrical connection 70. The first power converter 68 can convert the AC power from the integrated generator 66 to DC power that is usable to power the screed heating elements 60. The output AC power of the integrated generator 66 can be further connected to a power distribution hub 202 in the charging station 200 via the AC electrical connection 204.

The first power converter 68 can include a first DC power output connected to a power input of a zones power distribution box 72 of the screed 22 via a first DC electrical connection 74. The zones power distribution box 72 may control the distribution of the DC power received from the power converter 68 between the screed heating elements 60 to which the zones power distribution box 72 is connected via DC electrical connections 76. The heated portion(s) of the screed 22 may be separated into a plurality of zones, for instance, with each containing one or more of the screed heating elements 60.

The power converter 68 can supply power to other components of the tractor 14 and the screed 22. For example, in work areas where it is desirable or required to perform the paving process at night, it may be desirable to mount lights on the paving machine 10 to illuminate the work area. Power for the lights may be provided by an electrical outlet panel 80, such as a 120/240 VAC panel, that is connected to the power converter 68, for instance, in parallel with the zones power distribution box 72 of the screed 22. A second DC electrical connection 82 from the first power converter 68 can be connected to an electrical input to a second power converter 84 to convert the output DC power from the power converter 68 into the AC power required for the outlet panel 80. If necessary, additional combinations of outlet panels 80 and second power converters 84 may be connected to the second DC electrical connection 82 to provide outlets for powering additional lamps and appliances that may be necessary for executing the paving process.

A third DC electrical connection 92 from the first power converter 68 to an insulation monitoring system 90 may be provided to monitor (e.g., constantly or continuously) the entire electrical system of the paving machine 10 and monitor occurrences of fault conditions and shut down the paving machine 10 or affected components thereof if necessary.

As shown in FIG. 3, for instance, the charging station 200 can be connected to paving machine 10 such that, when power output from the power source 16 is not needed for the screed heating elements 60, as described in detail with reference to FIG. 4, such power is sent to the power distribution hub 202 via the AC electrical connection 204. Thus, the power distribution hub 202 can receive excess power from the integrated generator 66 and can send power to a charging side of the charging station 200, e.g., a power distribution panel 210 via a fast charger 206, e.g., charging faster than a current charging standard and/or a slow charger 208, e.g., charging at the current charging standard, or to an energy storage side of the charging station 200, e.g., a power converter 212 and an energy storage device 214, depending on where power is desired (e.g., needed).

To charge other electric machines (fully or partially electric) on the jobsite, e.g., compactors, skid steer loaders, sweepers, etc., these electric machines will need to connect to the charging station 200, physically, e.g., with a tether or cable, or wirelessly, e.g., via inductive coupling. This might be done in a stationary method or in a "charge on the go" method that allows the jobsite to continue to operate. Once the batteries on the electric machines start to run low, the electric machine would instruct a user to connect it to the charging station 200. The two machines would stay connected until the electric machine is charged to an adequate level so that the electric machine can continue its work. Alternatively, if the energy storage device of the charging station 200 is sufficiently charged, the charging station 200 alone (i.e., without the power source 16) may be used with another electric machine for recharging.

Figure 4:
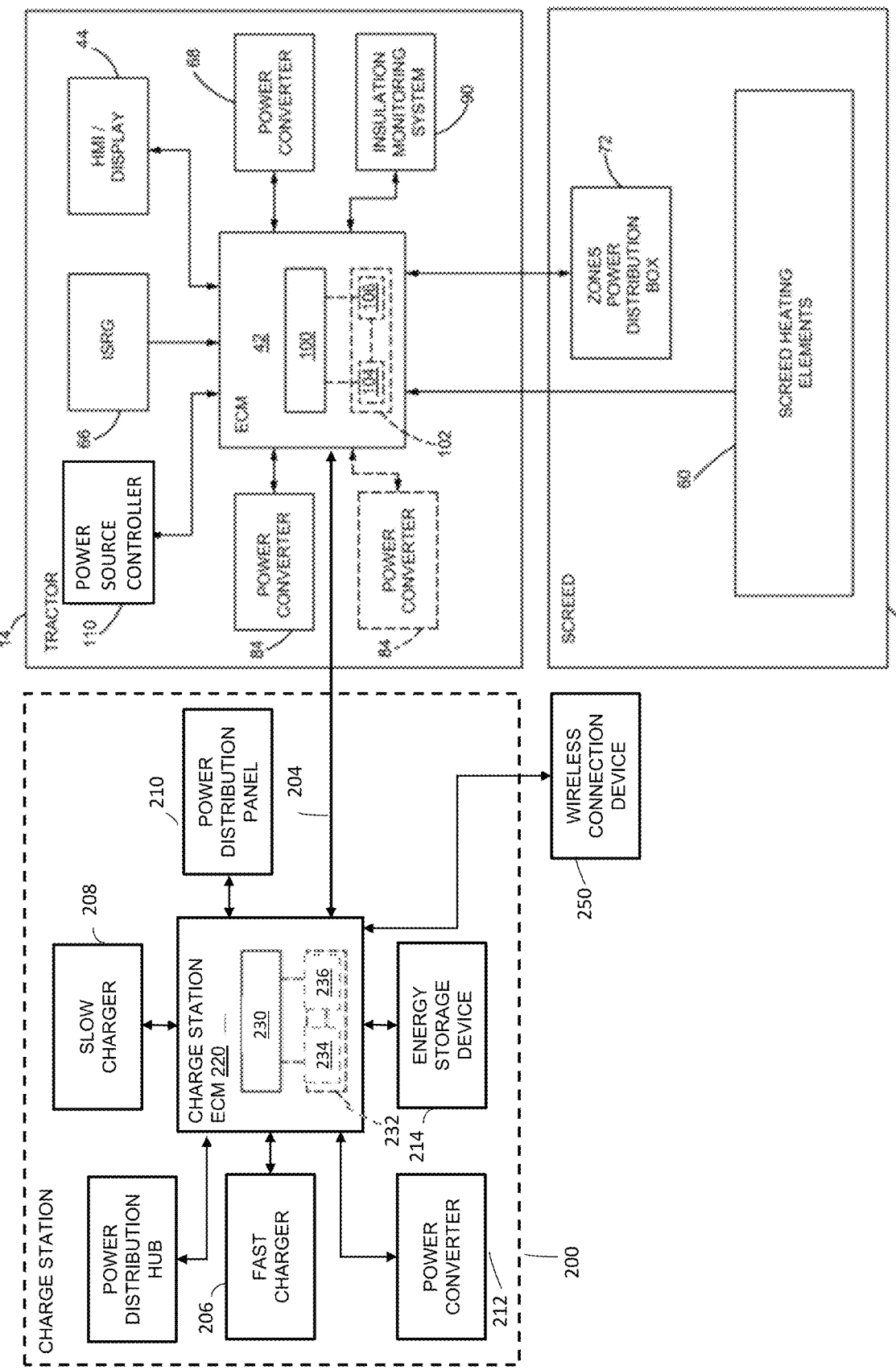
FIG. 4 is a block diagram of screed heat control and power distribution control according to one or more embodiments of the disclosed subject matter in the paving machine.
Figure 5:
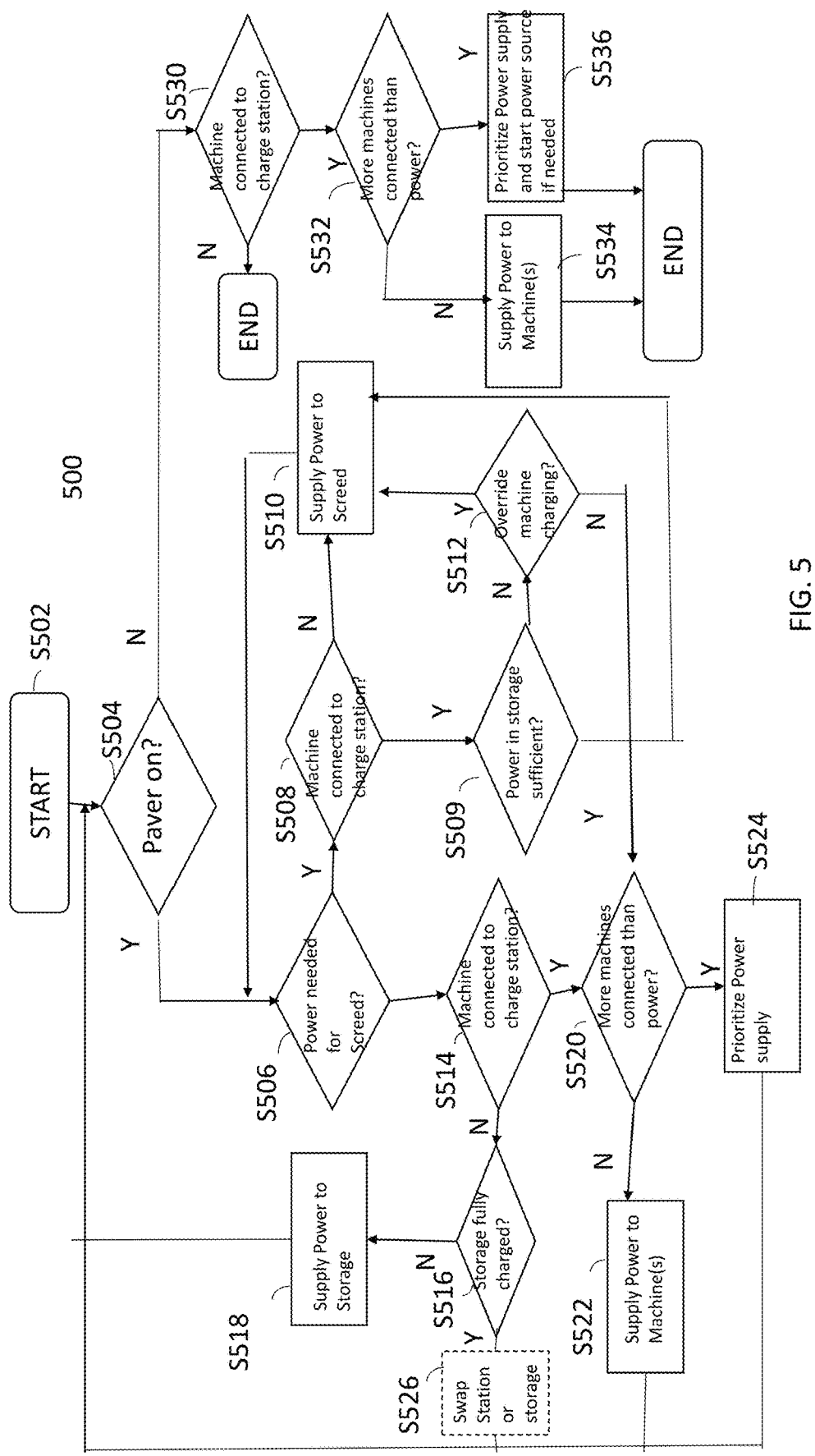
FIG. 5 is flow chart of a control method according to one or more embodiments of the disclosed subject matter.

As shown in FIG. 4, for instance, the paving machine 10 may further include a power source controller 110 operatively connected to the power source 16 and to the tractor ECM 42. The tractor ECM 42 may exchange control signals with the components 44, 66, 68, 72, 84, 90 to monitor and control the operation of the paving machine 10 to distribute the power from the integrated generator 66 to the screed heating elements 60 and to other components. The power source controller 110 can control the operation of the power source 16 to ensure sufficient power is generated and output to operate the systems of the paving machine 10, including the screed heating elements 60. As part of the power source control strategy, the tractor ECM 42 may determine when more or less power is required for the screed heating elements 60 and transmit control signals to the power source controller 110 to vary the output of the power source 16. In response to receiving the control signals from the tractor ECM 42, the power source controller 110 may send power output from the power source 16 not needed to meet the requirements of the screed heating elements 60 to the charging station 200. The power source controller 110 may also transmit information back to the tractor ECM 42 regarding the operational status of the power source 16 for use as necessary by the tractor ECM 42. In other words, the power source controller 110 may send power output from the power source 16 to heat the screed heating elements 60 and/or to the charging station 200. Thus, an electric mobile machine may be charged, regardless of whether the screed heating elements 60 are being heated, while both the electric mobile machine and the paving machine are moving, while one of the electric mobile machine and the paving machine 10 are moving, or while the electric mobile machine and the paving machine 10 are both stopped. Further, if sufficient power is stored in the storage device 214, the electric mobile machine may be powered even if the paving machine is not on.

The tractor ECM 42 may include a microprocessor 100 for executing a specified program, which controls and monitors various functions associated with the paving machine 10. The microprocessor 100 may include a memory 102, such as read only memory (ROM) 104, for storing a program or programs, and a random access memory (RAM) 106 which serves as a working memory area for use in executing the program(s) stored in the memory 102. Although the microprocessor 100 is shown, it is also possible and contemplated to use other electronic components such as a microcontroller, an ASIC (application specific integrated circuit) chip, or any other integrated circuit device.

As further shown in FIG. 4, the charging station 200 may include a charging station ECM 220 that can receive the power from the integrated generator 66 via the AC electrical connection 204 and can control the power distribution hub 202, the fast charger 206, the slow charger 208, the power distribution panel 210, the power converter 212, and the energy storage device 214. The energy storage device 214 may be an energy accumulator that accepts, stores, and releases energy on demand. The energy storage in the accumulator may be based on electrical, e.g., capacitors, electrochemical, e.g., rechargeable batteries, and so forth. The charging station ECM 220 may also be in communication with a wireless communication device 250 or other centralized monitor or repository of machines at the jobsite or remotely, e.g., in the cloud, to assist the charging station ECM 220 in determining charging priority based on various factors of machines that need charging, e.g., which electric machine is needed next, a level of charge remaining in the electric machine, and so forth. The charging station ECM 220 may also select the fast charger 206 or the slow charger 208 based on various factors, e.g., when the electric machine is needed next for a job or project, a level of charge remaining in the electric machine, and so forth. A user may also manually select the fast charger 206 or the slow charger 208.

Similar to the tractor ECM 42, the charging station ECM 220 may include a microprocessor 230 for executing a specified program, which can control and monitor various functions associated with the paving machine 10. The microprocessor 100 may include a memory 232, such as a ROM 234, for storing a program or programs, and a RAM 236 which serves as a working memory area for use in executing the program(s) stored in the memory 232. Although the microprocessor 230 is shown, it is also possible and contemplated to use other electronic components such as a microcontroller, an ASIC (application specific integrated circuit) chip, or any other integrated circuit device.

When one or multiple electric machines are plugged into the power distribution panel, the charging station ECM 220 can demand power from the tractor ECM 42. If the tractor 14 is not on or in a mode which does not allow for it to provide direct AC power, the charging station ECM 220 can pull power from the energy storage device 214. If the energy storage device 214 falls below a predetermined level, the charging station ECM 220 could ask the tractor ECM 42 to start the power source 16 and start generating power for charging a machine and/or the storage device 214. For example, if the paving machine 10 was parked at night with a machine plugged into it, instead of only partially charging the machine, the power source 16 could be started to finish charging the machine.

The power source controller 110, the tractor ECM 42, and the charging station ECM 220, or portions thereof (e.g., a processor), can be implemented using circuitry. As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus to perform various functions); and (c) to circuits, such as a microprocessor(s) or a portion of a microprocessor(s), that require software or firmware for operation, even if the software or firmware is not physically present.

INDUSTRIAL APPLICABILITY

As noted above, embodiments of the disclosed subject matter relate to systems, apparatuses, and methods for using power from an intermittently used internal generator on a machine to recharge other machines. Additionally or alternatively, an integrated generator on a machine may be used to charge other onsite components, e.g., a mobile office, or to charge an external battery bank to which electric mobile machines may be connected to recharge, e.g., after work or when the machine having an integrated generator is not in use during work. This battery bank may be mobile to travel where needed and/or charge while moving with the electric mobile machine or may be stationary.

FIG. 5 is a basic flow chart of a control method 500 according to one or more embodiments of the disclosed subject matter. The control method 500 may be implemented via a non-transitory computer-readable storage medium having stored thereon instructions that, when executed by one or more processors or controllers, cause the one or more processors or controllers to perform the control method 500. The power source controller 110, the tractor ECM 42, the charging station ECM 220, and/or by the wireless communication device 250 or other centralized monitor in communication with both the paving machine and the electric mobile machine. Methods as described herein can include some or all of the operations of the method 500.

Generally, the method 500 can start at operation S502 when the charging station 200 is connected to the paving machine 10. As noted above, the charging station 200 may be part of or attached to the paving machine 10.

First, an operational state of the paving machine 10 can be determined at operation S504. When the paving machine 10 is on, this can mean that the power source 16 of the paving machine 10 in on, i.e., operating. Optionally, this can mean that the paving machine 10 is moving, for instance, in a paving direction.

When paving machine 10 is on, the method 500 can proceed to determine whether power is needed for the heating elements 60 of the screed 22 in operation S506, for instance, based on the screed heat temperature relative to a predetermined temperature. When power is needed for the heating elements 60 of the screed 22, operation S508 can determine whether an electric machine is connected to the charging station 200. Such determining can be performed via wired and/or wireless connection detection operations performed relative to the power distribution panel 210 of the charging station 200 and the electric machine(s). If an electric machine is not connected to the charging station 200, power can be supplied to the screed 22 at operation S510, without regard to whether any power is to be supplied to an electric machine.

If an electric machine is connected to the charging station 200, operation S509 may determine whether or not there is sufficient power in the energy storage device 214, e.g., to charge at least one electric machine connected thereto (via the power distribution panel 210). Incidentally, for the electric machine to connect to the charging station 200 if any of the charging is to be performed when the paving machine 10 is moving, the electric machine and the paving machine 10 may be controlled, autonomously or semi-autonomously, for instance, to synchronize speeds so the two machines can travel at the same speed or within a speed window from each other. In one example, the two machines can be stopped, the electric machine can be connected to the charging station 200 for charging, and then the two machines can move together at the same speed. In another example, the paving machine 10 may be moving at a speed and the electric machine to be charged can move into position next to the paving machine 10 and match the speed of the paving machine 10 and connect to the charging station 200 for charging. Both the determination of the power level of the electric mobile machine and the control of movement of both machines may be realized, e.g., by the wireless communication device 250 or other centralized monitor in communication with both the paving machine 10 and the electric mobile machine.

If there is sufficient power in the energy storage device 214, then the method 500 can proceed to operation S520 and to operation S510. If there is not sufficient power in the energy storage device 214, then operation S514 can determine whether or not to override the charging of the machine. This may be done manually by a user or automatically in accordance with predetermined parameters, e.g., whether the screed temperature is within a predetermined range of the predetermined temperature. If the charging is overridden, the method 500 can proceed to operation S510. If not, the method 500 can proceed to operation S520.

If operation S506 determines that power is not needed for the screed 22, then operation S514 can determine whether an electric machine is connected to the charging station 200. If not, the operation S516 can determine whether the energy storage device 214 is fully charged. If the energy storage device 214 is fully charged, the method 500 can return to operation S504, with or without performing operation S526 of swapping the charging station 200 or the energy storage device 214 with one that is not full. For example, if the energy storage device 214 is compatible with an energy storage device of an electric mobile machine that needs charging, the energy storage device 214 and the energy storage device of the electric mobile machine may be swapped. Alternatively or additionally, plural charging stations 200 may be provided at the jobsite and may be swapped when the energy storage device 214 of a currently connected charging station 200 is full. If not, the method 500 can proceed to operation S518 to supply power to be stored in the energy storage device 214.

When operation S514 determines that an electric machine is connected to the charging station 200, operation S520 can determine whether more electric machines are connected to the charging station 200. If not, operation S522 can proceed to charge electric machine(s) connected to the charging station 200. If the connected electric machines exceed available power that can be supplied either directly from the internal generator 66 or stored in the energy storage device 214, then operation S524 may prioritize power supply to the electric machines connected thereto, e.g., which electric machine is needed next, a level of charge remaining in the electric machine, and so forth.

When operation S504 determines that the paving machine 10 is not on, operation S530 can determine whether an electric machine is connected to the charging station 200, as in operation S514. If not, the method 500 may end. If operation S532 determines an electric machine is connected to the charging station 200, the method 500 may analyze the power situation in operation S532, as in S520, except only considering power available from the energy storage device 214. The method 500 may then proceed to operation S534 or S536 based on the determination in operation S532, then ends.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The invention claimed is:

1. A paving machine, comprising:
    an integrated generator that supplies power to a component of the paving machine that intermittently demands power during operation of the paving machine;
    a charging station to provide power from the integrated generator to charge an electric mobile machine, the charging station including
    an energy accumulator;
    a connector for the electric mobile machine; and
    circuitry operatively coupling the charging station and the integrated generator, the circuitry configured to
    on condition that power is supplied by the integrated generator and an electric mobile machine is connected to the charging station, charge the electric mobile machine,
    on condition that power is supplied by the integrated generator and no electric mobile machine, including said electric mobile machine, is connected to the charging station, store power in the energy accumulator, and
    on condition that the electric mobile machine is connected and power is not supplied by the integrated generator, charge the electric mobile machine from the energy accumulator,
    determine whether more than one electric mobile machine, including said electric mobile machine, is connected to the charging station,
    determine whether the power supplied from the integrated generator and/or the energy accumulator is sufficient to charge all electric mobile machines connected to the charging station, and
    on condition that the power supplied from the integrated generator and/or the energy accumulator is not sufficient to charge all of the electric mobile machines connected to the charging station, prioritize charging of the electric mobile machines.

2. The paving machine according to claim 1, wherein the circuitry is further configured to:
    before storing power to the energy accumulator, determine that the energy accumulator is not full.

3. The paving machine according to claim 1, wherein the circuitry is further configured to:
    on condition that the component of the paving machine needs power and the electric mobile machine is connected to the charging station, determine whether a level of power stored in the energy accumulator is sufficient to charge the electric mobile machine; and
    on condition that the level of power stored in the energy accumulator is sufficient, supply power to the electric mobile machine.

4. The paving machine according to claim 3 wherein the circuitry is further configured to:
    on condition that the level of power stored in the energy accumulator is not sufficient, determine whether to override charging of the electric mobile machine.

5. The paving machine according to claim 4, wherein the circuitry is further configured to:
on condition that the charging of the electric mobile machine is overridden, supply power to the electric mobile machine.

6. The paving machine according to claim 1, further comprising:
a fast charger; and
a slow charger, wherein the circuitry is further configured to:
on condition that power is supplied by the integrated generator and the electric mobile machine is connected, select one of the fast charger and the slow charger to charge the electric mobile machine.

7. A system, comprising:
circuitry operatively coupled to an integrated generator that supplies power to a component of a mobile machine that intermittently demands power during operation of the mobile machine and to a charging station, the circuitry configured to
on condition that the component of the mobile machine does not need power, supply power to the charging station; and
on condition that an electric mobile machine is connected to the charging station, supply power from the charging station to the electric mobile machine, otherwise store power supplied to the charging station in an energy accumulator;
on condition that the component of the mobile machine needs power and the electric mobile machine is connected to the charging station, determine whether a level of power stored in the energy accumulator is sufficient to charge the electric mobile machine;
on condition that the level of power stored in the energy accumulator is sufficient, supply power to the electric mobile machine;
on condition that the level of power stored in the energy accumulator is not sufficient, determine whether to override charging of the electric mobile machine; and
on condition that the component of the mobile machine needs power and the electric mobile machine is connected to the charging station, determine whether to override charging of the electric mobile machine.

8. The system according to claim 7, wherein the circuitry is further configured to:
on condition that the charging of the electric mobile machine is overridden, supply power to the component of the mobile machine.

9. The system according to claim 7, wherein the circuitry is further configured to:
on condition that the charging of the electric mobile machine is overridden, supply power to the component of the mobile machine, otherwise supply power to the charging station.

10. The system according to claim 7, wherein the circuitry is further configured to:
determine whether more than one electric mobile machine, including said electric mobile machine, is connected to the charging station; and
determine whether the power supplied from the integrated generator and/or the energy accumulator is sufficient to charge all electric mobile machines, including said electric mobile machine, connected to the charging station.

11. The system according to claim 10, wherein the circuitry is further configured to:
on condition that the power supplied from the integrated generator and/or the energy accumulator is not sufficient to charge all electric mobile machines, including said electric mobile machine, connected to the charging station, prioritize charging of the electric mobile machines.

12. A method for operating a mobile machine on a jobsite to provide power to a charging station for charging an electric mobile machine, the mobile machine including an integrated generator that is used intermittently by a component of the mobile machine during operation of the mobile machine, the method comprising:
operating the integrated generator of the mobile machine to produce power, the power to be supplied to the component of the mobile machine and to the charging station;
on condition that the component of the mobile machine does not need power, supplying power to the charging station;
on condition that charging of the electric mobile machine is overridden, supplying power to the component of the mobile machine, otherwise supplying power to the charging station; and
at least one of storing power supplied to the charging station and using power supplied to the charging station to charge the electric mobile machine connected to the charging station.

13. The method according to claim 12, wherein, during charging, the mobile machine and the electric mobile machine are moving.

* * * * *